United States Patent [19]
Barak et al.

[11] Patent Number: 6,023,719
[45] Date of Patent: *Feb. 8, 2000

[54] SIGNAL PROCESSOR AND METHOD FOR FAST FOURIER TRANSFORMATION

[75] Inventors: Itzhak Barak, Tel Aviv; Yaron Ben-Arie, Ramat-Gan; Effi Orian, Pardessia, all of Israel; Shao Wei Pan, Lake Zurich; Shay Ping Wang, Long Grove, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/923,687

[22] Filed: Sep. 4, 1997

[51] Int. Cl.[7] ..................................................... G06F 17/14
[52] U.S. Cl. ........................... 708/405; 708/404; 708/517
[58] Field of Search ......................... 364/726.04, 726.03, 364/726.02, 748.5; 708/405, 404, 403, 517

[56] References Cited

U.S. PATENT DOCUMENTS

| | | |
|---|---|---|
| 3,371,197 | 2/1968 | Munson ................................ 364/748.5 |
| 3,584,781 | 6/1971 | Edson ................................ 364/726.02 |
| 3,617,720 | 11/1971 | Gentleman .......................... 364/726.02 |
| 3,704,826 | 12/1972 | Constantin .......................... 364/726.02 |
| 3,803,391 | 4/1974 | Vernet ................................ 364/726.03 |
| 3,871,577 | 3/1975 | Avellar et al. ...................... 364/726.02 |
| 4,023,028 | 5/1977 | Dillard et al. ...................... 364/726.03 |
| 4,025,772 | 5/1977 | Constant ................................. 235/156 |
| 5,696,986 | 12/1997 | Pan et al. .............................. 364/748.5 |

*Primary Examiner*—David H. Malzahn
*Attorney, Agent, or Firm*—James E. Gauger

[57] ABSTRACT

With reference to FIG. 1 signal processor (10) for performing transformations of sets of input data points comprises a memory for storing a first half input data points and a second half input data points, an adder unit for pairwise adding one real part of each one first half input data point and a second half input data point and providing adder output data, and a computing unit for performing transformations upon the adder output data. Addition for data reduction and data transformation are carried out simultaneously by different units.

29 Claims, 3 Drawing Sheets

SIGNAL PROCESSOR AND METHOD FOR FAST FOURIER TRANSFORMATION

RELATED INVENTIONS

The present invention is related to the commonly assigned USA applications:

[1] "Computer processor having a pipelined architecture and method of using same", having Ser. No. 08/520,666 filed on Aug. 28, 1995, now U.S. Pat. No. 5,771,391;

[2] "Computer processor utilizing logarithmic conversion and method of use thereof", having Ser. No. 08/403,158 filed on Mar. 13, 1995, now U.S. Pat. No. 5,685,008;

[3] "Method and system for performing a convolution operation", having Ser. No. 08/535,800 filed on Sep. 28, 1995;

[4] "Logarithm/inverse logarithm converter and method of using same", having Ser. No. 08/381,368 filed on Jan. 31, 1995 now U.S. Pat. No. 5,642,305;

[5] "Computer processor having a pipelined architecture which utilizes feedback and method of using same", having Ser. No. 08/520,145 filed on Aug. 28, 1995, now U.S. Pat. No. 5,657,263.

The subject matter of the above-identified related inventions is hereby incorporated by reference into the disclosure of this invention.

FIELD OF THE INVENTION

The present invention relates generally to digital signal processing and, in particular, to signal processor and method for performing Fast Fourier Transformation on a parallel architecture.

BACKGROUND OF THE INVENTION

In the electronic arts it is often desired to perform a Discrete Fourier Transformation DFT) of an input signal. Such DFT operation usually requires performing matrix multiplications of large matrixes. Based on the DFT properties, there are many Fast Fourier Transformation (FFT) algorithms, as described in "Digital signal processing" by John G. Proakis and Dimitris G. Manolakis, 3rd edition, Prentice-Hall 1996. These algorithms use symmetry properties of transformation coefficients depending specific numbers of data points to reduce the size of the matrixes to multiply at the expense of a larger number of matrix multiplications.

A general FFT, called Radix 2 FFT, is illustrated as follows. In the N-point DFT operation of an input signal $\{x(i), 0 \leq i \leq N\}$ with an even number N of input data points, the DFT equation is:

$$X(k) = \sum_{i=0}^{N-1} x(i) e^{-j\frac{2\pi ik}{N}}, \quad k = 0, 1, 2, \ldots N-1. \tag{1}$$

With the simple transformations $$X(k) = \sum_{i=0}^{N/2-1} x(i) e^{-j\frac{2\pi ik}{N}} + \sum_{i=N/2}^{N-1} x(i) e^{-j\frac{2\pi ik}{N}}, \quad k = 0, 1, 2, \ldots N-1,$$

$$X(k) = \sum_{i=0}^{N/2-1} \left[ x(i) e^{-j\frac{2\pi ik}{N}} + x(i+N/2) e^{-j\frac{2\pi (i+N/2)k}{N}} \right],$$

$$k = 0, 1, 2, \ldots N-1,$$

$$X(k) = \sum_{i=0}^{N/2-1} [x(i) + x(i+N/2) e^{-j\pi k}] e^{-j\frac{2\pi ik}{N}}, \quad k = 0, 1, 2, \ldots N-1,$$

this may be written as $$X(k) = \sum_{i=0}^{N/2-1} [x(i) + x(i+N/2)*(-1)^k] e^{-j\frac{2\pi ik}{N}}, \quad k = 0, 1, 2, \ldots N-1.$$

Now, X(k) is split into even- and odd-numbered samples $X_e(k)$ and $X_o(k)$ $$X_e(k) = \sum_{i=0}^{N/2-1} [x(i) + x(i+N/2)] e^{-j\frac{2\pi ik}{N}}, k = 0, 2, \ldots N-2,$$

$$X_o(k) = \sum_{i=0}^{N/2-1} [x(i) + x(i+N/2)] e^{-j\frac{2\pi ik}{N}}, k = 1, 3, \ldots N-1.$$

With the transformation coefficients $$W_N^{ik} = e^{-j\frac{2\pi ik}{N}}$$

and the sums $g_e(i)=x(i)+x(i+N/2)$, $g_o(i)=x(i)-x(i+N/2)$ the N-point FFT of Eq. (1) can be expressed as:

$$X(k) = \sum_{i=0}^{N-1} x(i) W_N^{ik}, \quad k = 0, 1, 2, \ldots N-1 \tag{2}$$

and further written as two N/2-point transformations $$X_e(k) = \sum_{i=0}^{N/2-1} g_e(i) W_N^{ik}, \quad k = 0, 2, \ldots N-2, \tag{3}$$

$$X_o(k) = \sum_{i=0}^{N/2-1} g_o(i) W_N^{ik}, \quad k = 1, 3, \ldots N-1, \tag{4}$$

for the even and odd values of k.

Eq. (2) can be seen as the multiplication of input row vector x with matrix W to obtain row vector X. Similarly, Eqs. (3) and (4) can be seen as the multiplication of row vectors $g_e$ and $g_o$ with even and odd columns of coefficient matrix W to obtain row vectors $X_e$ and $X_o$, respectively. Thus, the N-point transformation is split in two similar N/2-point transformations that are easier to compute. The input vector x or input data set has real or complex elements or data points and the transform vector X or output data set has complex elements or data points.

According to the state of the art, these steps are performed on a computer with a single central processing unit (CPU) which computes the sums of products one after the other. It fetches the data it needs for computing the actual product by direct memory access (DMA). Then it computes the actual product by normal floating point multiplication. However, a signal processor can be specialized to compute such vector products, using processor cache memory to store the coefficient matrix elements. Such a signal processor receives the input vector x and outputs elements of the transform vector X, but not necessarily in the right order. The correct order is established by storing the elements of the transform vector in a memory and reading them out in the right order.

Signal processors according to the prior art may use the above splitting scheme in that they receive the input vector x and store its elements in a memory, compute the vectors $g_e$ and $g_o$, compute result vectors $X_e$ and $X_o$. and output finally transform vector X. In these signal processors, the processing unit that performs the multiplications and summations, is also occupied by performing the additions in order to generate the vectors $g_e$ and $g_o$. But, this results in undesirable long execution times.

There is a need to perform FFT more efficiently.

DETAILED DESCRIPTION OF THE PREFERRED EMBODIMENT

Generally, the present invention provides a signal processor that receives an input signal and, in turn, generates an output signal. The input and output signals are typically digital words that represent numerical data.

An advantage of the present invention is that it provides a signal processor that is capable of performing sophisticated mathematical operations at high processing speeds. Another advantage of the present invention is that it provides a signal processor that has a high data throughput rate. Yet another advantage of the present invention is that it provides a signal processor that is capable of handling twice as long input signals in parallel. Still another advantage of the present invention is that it provides a signal processor that is capable of transforming input signals twice as fast. A further advantage of the present invention is that it provides a signal processor that is efficiently implemented on a microchip, and is consequently small and consumes relatively little power.

Figure 1:
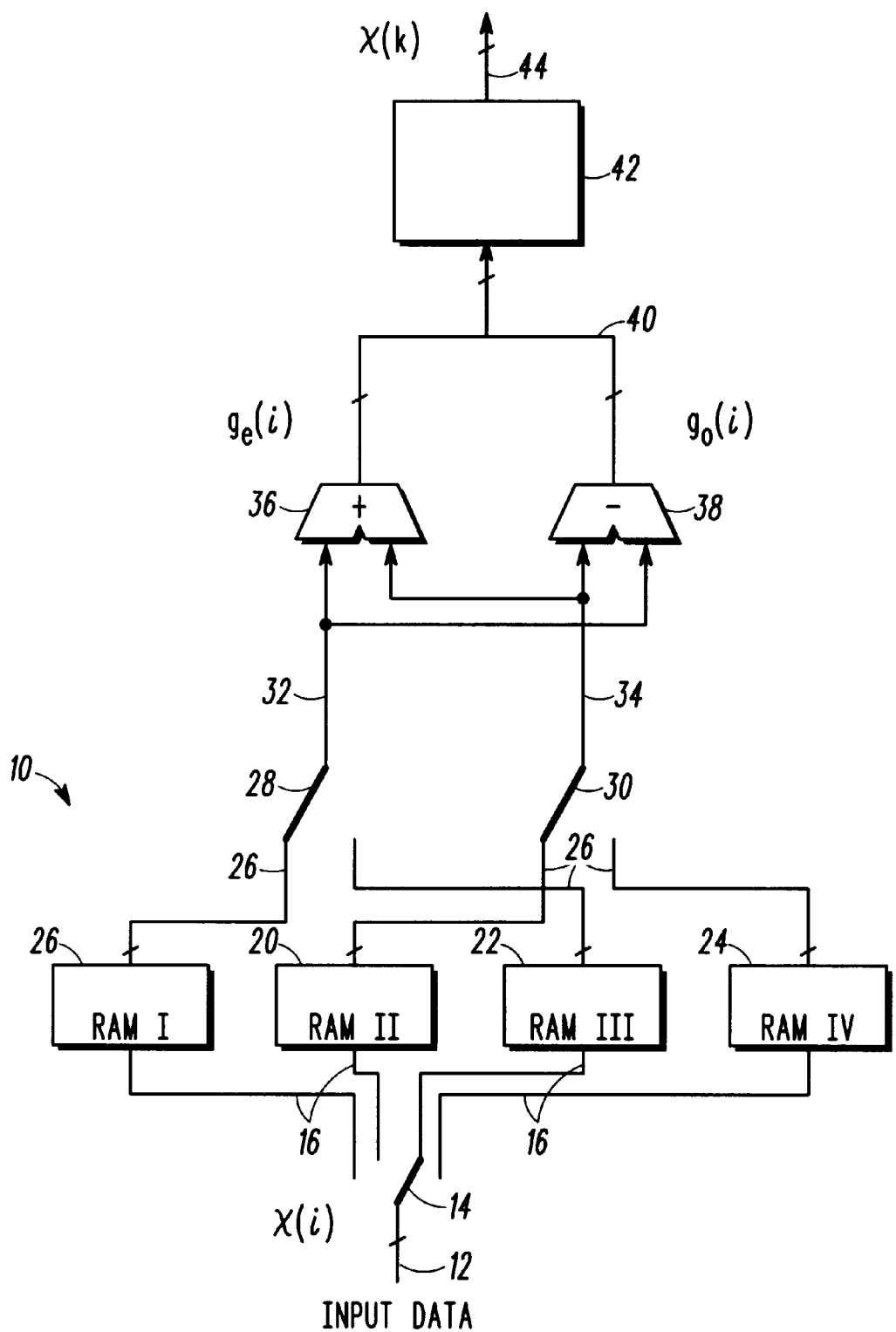
FIG. 1 is a simplified schematic diagram of a signal processor according to a first embodiment of the present invention.

FIG. 1 illustrates a signal processor in accordance with a first embodiment of the present invention. Signal processor 10 comprises data input bus 12, input switch 14, input switch lines 16, RAM memories 18 RAM I, 20 RAM II, 22 RAM III, 24 RAM IV, memory switch lines 26, memory switch 28, 30, adder input lines 32, 34, adders 36, 38, adder output line 40, computing unit 42, and data output bus 44.

Computing unit 42 is adapted to compute the multiplications and summations to carry out Eqs. (1) and (2) above and therefore also to carry out Eqs. (3) and (4). This computation is done serially. Several input data sets are to be transformed in series. The transformation coefficient data are stored in a cache memory of computing unit 42. The input data x(i) of the first set to be transformed enter signal processor 10 via data input bus 12, one after the other. The first half of N input values are submitted via input switch 14 and input switch lines 16, to memory 18 RAM I. The second half of the N input values are submitted via input switch 14 and input switch lines 16, to memory 20 RAM II. Pairs of data points representing x(i) of the first half of the N input values and x(i+N/2) of the second half of the N input values are read per clock cycle from RAM I 18 and RAM II 20, respectively. These data pass memory switch lines 26, memory switches 28, 30, and adder input lines 32, 34, and enter adders 36 and 38 substantially simultaneously. Adder 36 adds these two values to build $g_e(i)$. Adder 38 subtracts these two values to build $g_o(i)$, wherein this subtraction is conveniently an addition with a changed sign of x(i+N/2). Then the values $g_e(i)$ and $g_o(i)$ are fed via adder output line 40 to computing unit 42. Computing unit 42 builds $X_e$ and $X_o$ and outputs transform vector X via data output bus 44.

The manner in which the computation is done depends on the features of computing unit 42. A simple serial computing unit 42 can just build one sum of real multiplication products. Then, RAM I and RAM II are repeatedly read out to build at first the real part Re(X(0)) from $g_e(i)$ then the imaginary part Im(X(0)) from $g_e(i)$, both via adder 36, then the real part Re(X(1)) from $g_o(i)$, then the imaginary part Im(X(1)) from $g_o(i)$, both via adder 38, and so on.

A parallel architecture computing unit 42 can build several sums of products in parallel and therefore can build several complex X(k) in parallel. By this computation the first Fourier transform X of the first set of input data is generated. It is desirable to avoid wait states in the computing unit. Thus, the second set of input data is loaded into the memory, while the first set of data is being processed in the computing unit. The first and second halves of the second set of input data are written to a different memory part, namely RAM II 22, RAM IV 24, respectively. This alternative loading of the RAMs allows the Fourier transform of the next set of input data to begin as soon the old set is out of the summation register of computing unit 42, with appropriate setting of switches 28, 30. Thus, computing unit wait states are avoided.

Figure 2:
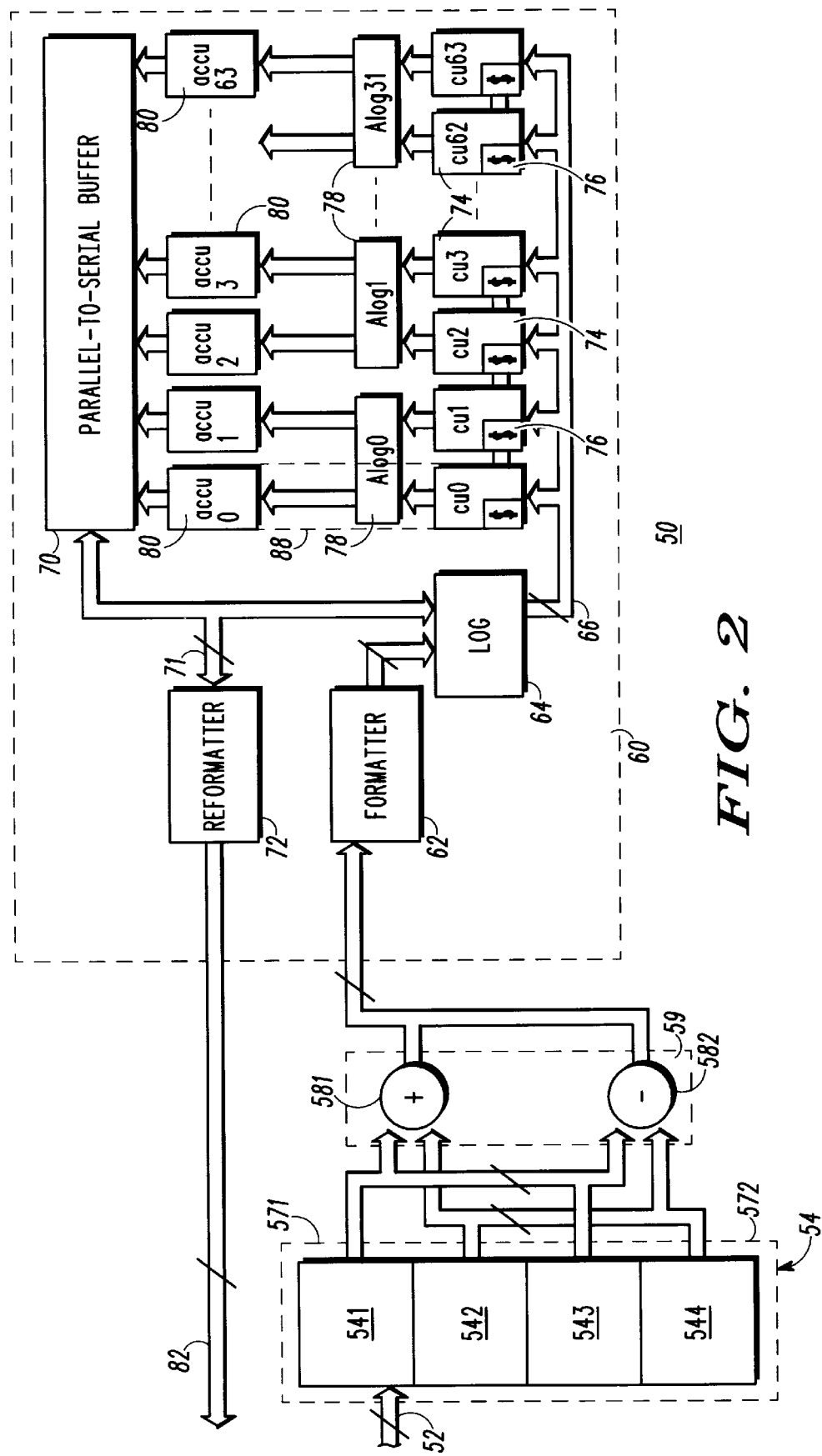
FIG. 2 is a simplified schematic diagram of another signal processor according to a second embodiment of the present invention.

FIG. 2 illustrates a signal processor in accordance with a second and preferred embodiment of the present invention. In this example a multi-port RAM is used in conjunction with a parallel architecture computing unit. Signal processor 50 comprises data input bus 52, RAM 54 comprising four RAM sections 541, 542, 543, and 544, grouped in two memory parts 571 and 572, adders 581, 582, computing unit 60, and data output bus 82.

Computing unit 60 comprises formatter 62, logarithmic converter LOG 64, data pipeline 66, parallel-to-serial buffer 70, data out line 71 and reformatter 72. Computing unit 60 comprises a plurality of computing elements 74, e.g. cu0 ... cu63, each having a cache memory 76. Computing unit 60 further comprises a plurality of inverse logarithmic converters 78, e.g. Alog0 ... Alog31, and a plurality of accumulators 80, e.g. accu0 ... accu63. The number H of computing elements 74 and accumulators 80 is in this embodiment is H=64. Signal processor 60 is connected to data output bus 82. Each computing element 74 has an associated accumulator 80 whereas two computing elements 74 share one associated inverse logarithmic converter 78. One computing element 74 and its associated accumulator 80 together with its associated (shared) inverse logarithmic converter 78 are referred to as processing element 88. While H=64 is convenient, larger and smaller numbers of processing elements 88 can be used. Also, alogs 78 need not be shared and each processing element can have an individual alog 78.

Computing unit 60 is adapted to compute the multiplications and summations to carry out Eq. (1) and (2) above and therefore also to carry out Eqs. (3) and (4). This computation is done in parallel. Several input data sets of the same size, i.e. with the same transformation coefficients, are transformed in series. These sets are alternatingly stored in memory parts 571, 572 of two memory sections each, e.g. 541, 542 and 543, 544 respectively. After storing a first set of data this first set is processed and the second set is stored while the first set is being processed, and so on. The transformation coefficient data are stored in cache memory 76 of computing unit 60. In this example, every computing element 74 has its own cache memory 76. However, all computing elements 74 can have a large common cache memory 76 or the individual cache memories can be used as a large common cache memory.

The input data x(i) of the first set to be transformed enter signal processor 50 via data input bus 52, one after the other. The first half of N input values are stored in the first RAM section 541. The second half of the N input values are stored in the second RAM section 542. Multi-port RAM 54 allows simultaneous read and write operations and simultaneous reading from different RAM sections 541–544. In the order of the incoming data, pairs of data points representing x(i) of the first half of the N input values and x(i+N/2) of the second half of the N input values are read per clock cycle from first and second RAM sections 541, 542, respectively. These data simultaneously enter both adders 581, 582 which form together adder unit 59. First adder 581 (+) adds these two values to build $g_e(i)$. Second adder 582 (−) subtracts these two values to build $g_o(e)$, wherein this subtraction is conveniently an addition with a changed sign of x(i+N/2). Then the values $g_e(i)$ and $g_o(i)$ are fed to computing unit 60. Computing unit 60 builds $X_e$, and $X_o$ and outputs transform vector X via data output bus 82.

Signal processor 50 is used to provide an output signal that is a transformation of an input signal. The input signal $\{x(i), 0 \leq i \leq N\}$ consists of an ordered number N of input data points of real or complex values. Real values consist of one floating point data word each and complex values consist of two floating point data words each. Some or all processing elements 88 can compute in parallel and carry out the same instruction with the same input data but different data (e.g. different coefficients) from their respective cache memory. Processing elements 88 compute pairwise one complex data point, one processing element 88 computes the real part and the other processing element computes the imaginary part. The number N of input data points is known in advance and determines the complexity of the transformation calculation. In general, the result of the transformation will be an output signal $\{X(i), 0 \leq k \leq N\}$ with the same number of data points as the input signal. But there are situations where not all formally existing output signal data points are needed and therefore a smaller output signal $\{X(i), 0 \leq k \leq N'\}$ with $N' \leq N$ is calculated.

The transformation coefficient data $$W_N^{ik} = e^{-j\frac{2\pi ik}{N}}$$

are stored in cache memory 76 of computing unit 60. The input signal points are fed serially to signal processor 50 and each processing element 88 computes, for example, one half of complex output signal point with H processing elements 88 in parallel. This example explains how the signal processor according to the invention computes transformations in parallel. This example also explains how the signal processor according to the invention computes multiplications in the logarithmic domain.

The transformation contains a number of sums of products of complex multiplications. Thus, a large number of signal data points are multiplied with a number of coefficients. In this example pairs of two processing elements compute one complex output signal data point, i.e. one processing element computes the real part, the other the imaginary part of the output signal data point. Therefore, each processing element computes only real multiplications that are summed up. The invention makes use of the fact, that several products contain the same factors (e.g. the same coefficients and different data, the same data and different coefficients, or both). In particular, coefficients are transformed into logarithmic form and stored only once for all data elements to which they apply. On one hand, several sums can be computed in parallel. On the other hand, the multiplication can be done by addition in the logarithmic domain. This example uses both to the additional advantage, that the logarithmic conversion of each factor happens only once, even if the factor appears in different products.

The following method applies: The coefficients are converted once to their logarithm and stored in a cache memory. The input data is converted serially to its logarithm, and fed to all processing units in parallel. The processing units compute their respective products as additions in the logarithmic domain. Then, the products are converted back to the normal domain. This conversion takes care of the signs of the factors in the normal domain which bypass the logarithmic domain. The products with the correct sign are summed by the accumulator of the respective processing element. After the last signal data point has run through the processing elements and the last products are added to their respective sums, all complex output signal data points are complete simultaneously and transferred to the parallel-to-serial buffer to be read out via the data output bus.

Now, the method is explained in detail: Both required transformations of $g_e$ and $g_o$ can be expressed as:

$$X_e(k) = \sum_{i=0}^{N/2-1} g_{e,o}(i) W_N^{ik}, \quad k = 0, 1, 2, \ldots N-1$$

with the transformation factors or coefficients $$W_N^{ik} = e^{-j\frac{2\pi ik}{N}}.$$

Operation of computing unit 60 begins with storing both the sign and the logarithms of the absolute values of the transformation factors or coefficients $W_N^{ik}$ in the cache memories 76 of processing elements 88. The first two processing elements 88 compute the complex transform point of the first even k from $g_e$ and the second two processing elements 88 compute the complex transform point of the first odd k from $g_o$ and so on. The signals $g_e$ and $g_o$ that are to be transformed come directly to computing unit 60, their elements alternatingly sequentially. The signal elements are processed by the half of processing elements 88 in parallel with respect to odd or even k. The input signal enters computing unit 60, one floating point data word per clock cycle, one complex data point per two clock cycles. Formatter 62 reformats the input signal to a data format that is easy to convert to logarithmic form. This step is preferable in cases where the computing unit 60 uses a different data format than that of the input signal. Each floating point data word's absolute value is converted to its logarithm equivalent by logarithmic converter 64. This can be done by calculation or using a look-up table or using a combination thereof. The sign of the floating point data word is handled separately and passes directly to inverse logarithmic converters 78 by a separate connection. This connection carrying the sign information from LOG unit 64 to ALOG unit 78 is omitted for convenience of explanation.

The logarithm input signal data are sent into data pipeline 66, one word per clock cycle, one complex data point per two clock cycles. Data pipeline 66 feeds the logarithm input signal data in parallel to all N active computing elements 74 of computing unit 60. There, each computing element 74 adds the appropriate logarithmic coefficient value from its cache memory 76 to the entering data value to provide a log sum. Then, each log sum is converted back to the normal domain by inverse logarithmic converters 78. Each result is a product in the normal domain. The sign of such product is calculated from the signs of each product's factors which have bypassed the logarithmic domain. The product is then transferred to accumulator 80 of its processing element 88. Each accumulator 80 sums one product each clock cycle.

In this example the input signal is complex and contains N real signal words and N imaginary signal words. Processing elements 88 compute pairwise one complex data point; one processing element 88 computes the real part, and the other computes the imaginary part. Both include two real multiplications that add to the sum per input data point. That means, 2N sums containing N/2 complex products (N real products) each, are calculated in parallel over 2N processor clock cycles (2*N/2 complex data points). Then, all 2N sums are completed simultaneously which represent to N complex output signal points. These sums are transferred to parallel-to-serial buffer 70 to form the output signal. Parallel-to-serial buffer 70 receives several data values in parallel and outputs them in serial upon a parallel bus, namely data out line 71. The output signal is successively transferred via data out line 71 to reformatter 72, where it is reformatted to the same data format as the input signal. Then, the output signal is read successively from the signal processor on output bus or lines 82.

Expressed in still greater detail this is denoted as a method for performing a discrete Fourier Transformation of an input signal of an even number of input data values on a signal processor having a first memory section, a second memory section, an adder and a computing unit with a cache memory, to produce an output signal, which method comprises the following steps:

(a) storing transformation coefficients $$W_N^{ik} = e^{-j\frac{2\pi ik}{N}}$$

in the cache memory, anytime prior to step (d);

(b) storing the first half of data values in the first memory section, storing the second half of data values in the second memory section;

(c) building in either order a sum vector and a difference vector (c.1) $g_e(i)=x(i)+x(i+N/2)$ of the pairwise sums of one data value of the first half data values and one data value of the second half data values with the adder, (c.2) $g_o(i)=x(i)-x(i+N/2)$ of the pairwise differences of one data value of the first half data values and one data value of the second half data values with the adder;

(d) performing the following matrix operations in either order (d.1)

$$X_e(k) = \sum_{i=0}^{N/2-1} g_e(i)W_N^{ik}, \quad k=0,2,\ldots N-2,$$

upon the sum vector with the computing unit, and
(d.2)

$$X_o(k) = \sum_{i=0}^{N/2-1} g_o(i)W_N^{ik}, \quad k=1,3,\ldots N-1,$$

upon the difference vector with the computing unit; and (e) outputting as output signal the Fourier Transform X (k) of the input signal wherein $X_e(k)$ are the even elements thereof and $X_o(k)$ are the odd elements thereof.

Figure 3:
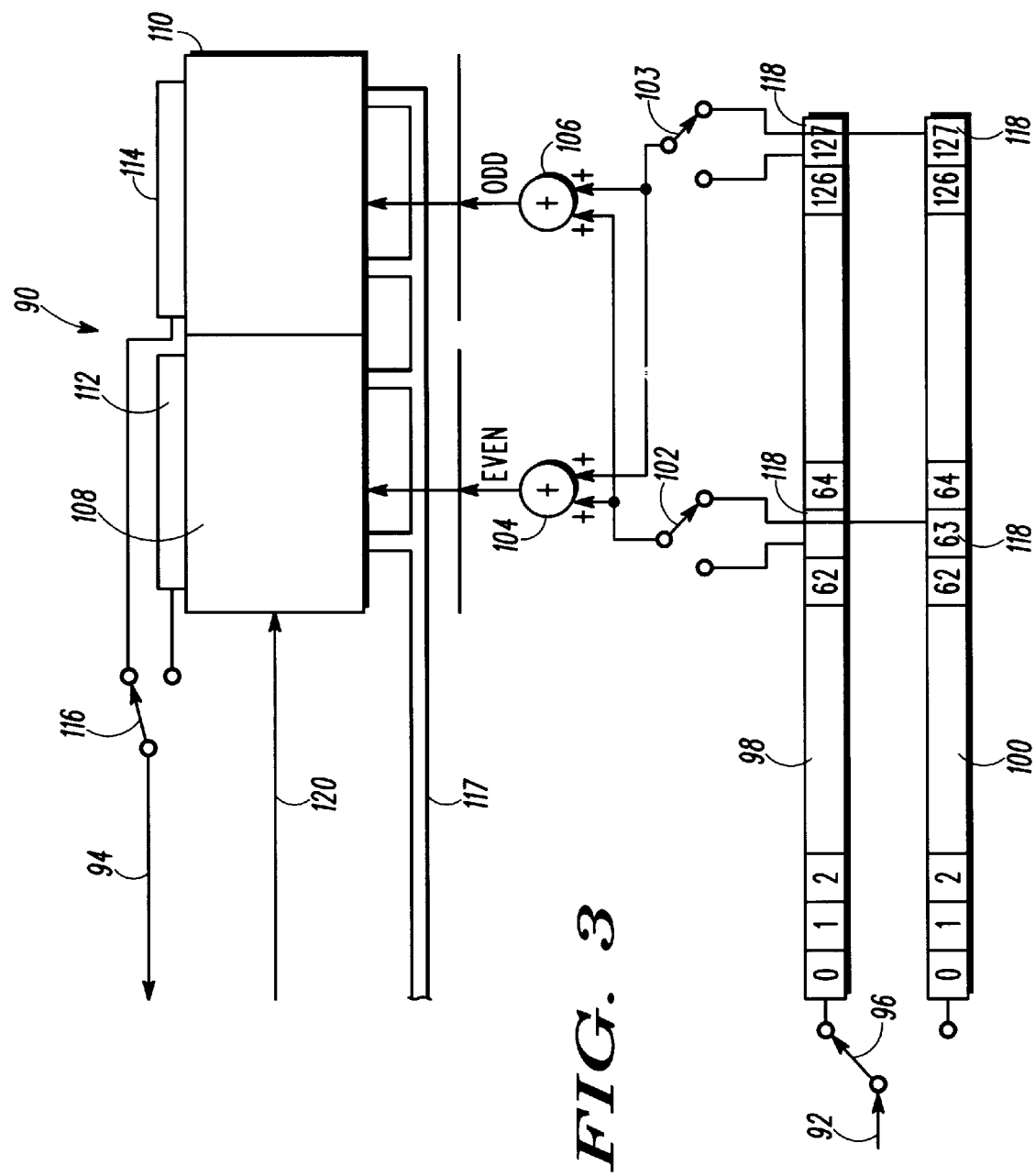
FIG. 3 is a simplified schematic diagram of a further signal processor according to a further embodiment of the present invention.

FIG. 3 illustrates schematically a signal processor in accordance with a further preferred embodiment of the present invention. This signal processor uses shift registers and uses two computing units similar to the type described in FIG. 2.

Signal processor 90 is connected to data input bus 92, and data output bus 94 and comprises input switch 96, shift registers 98, 100, memory switches 102, 103, adders 104, 106, computing units 108, 110, having output buffers 112, 114, respectively and output switch 116.

The computation is done in parallel, wherein $g_e$ and $g_o$ are each processed by one of the computing units 108, 110. Again, several input data sets of the same size are transformed in series. The transformation coefficient data are stored once in a cache memory of computing units 108, 1 10 via cache bus 117. The input data x(i) of the first set to be transformed enter signal processor 90 via data input bus 92, one after the other. The first set of N input values is submitted to shift register 98. The second set of the N input values is submitted to shift register 100, and so on alternatingly. In the order of the incoming data, pairs of data points representing x(i) of the first half of the N input values and x(i+N/2) of the second half of the N input values are read per clock cycle from readout cells 118 of shift registers 98, 100. These data pass memory switches 102, 103 and enter simultaneously adders 104 and 106. Adder 104 adds these two values to build $g_e(i)$. Adder 106 subtracts these two values to build $g_o(i)$, wherein this subtraction is preferably an addition with a changed sign of x(i+N/2). Then the values $g_e(i)$ and $g_o(i)$ are fed to computing units 108, 110. Adders 104, 106 can add complex values in one clock cycle, real and imaginary parts in different registers, or can add real values in one clock cycle, real and imaginary parts in two clock cycles successively. Computing units 108, 110 build $X_e$ and $X_o$, respectively, according to instructions submitted via control bus 120, and provide them in output buffers 112, 114, respectively. Output buffer 112 contains the even elements and output buffer 114 contains the odd elements of the Fourier Transform or other transformation being performed. Output transform vector X is generated by alternatingly reading out elements of output buffers 112, 114 via output switch 116 to data output bus 94.

With four adders and four computing units one can use the above described scheme separately for the real and imaginary parts of each complex output data point. Then each shift register has four readout cells that are read out in parallel, and two complex output data points are computed in parallel.

Those skilled in the art will understand based on the description herein, the advantages of the described embodiments. From their experience they will know that these details can be combined differently. For example, a shift register with N/2+1 cells with readout cells at either ends can be used or one adder sufficient to do the addition and the subtraction subsequently can be used instead of two. Furthermore, they will understand that the switches shown in the examples can be realized by a variety of electronic means including the timing of selective bus operations. Also, the adders may or may not be clocked.

In the foregoing detailed description of the preferred embodiment, reference is made to the accompanying drawings which form a part hereof, and in which are shown by way of illustration specific embodiments in which the invention can be practiced. These embodiments have been described in sufficient detail to enable those skilled in the art to practice the invention, and it is to be understood that other embodiments can be utilized and that logical, mechanical and electrical changes can be made without departing from the spirit and scope of the present invention. The foregoing detailed description is, therefore, not to be taken in a limiting sense, and the scope of the present inventions is defined only by the appended claims.

We claim:

1. A signal processor for performing transformations of sets of input data points comprising:

random access memory for storing a first half of N input data points and a second half of the N input data points, an adder unit to generate a sum vector of the pairwise sums of one data point of the first half of the N input data points x(i) and one data point of the second half of the N input data points x(i+N/2), where i=0 to N−1;

a log converter to perform logarithmic conversion on the sum vector to generate log signals;

a computing unit for performing transformations upon the log signals to produce processed signals;

an inverse-log converter to perform inversion-logarithmic conversion of the processed signals to generate inverse-log signals; and an accumulator to sum the inverse-log signals to produce accumulated signals.

2. The signal processor of claim 1, wherein the adder unit is adapted to build pairwise the sum and the difference of one real part of each first half of the input data points and the second half of the input data points.

3. The signal processor of claim 2, wherein the adder unit comprises a first adder and a second adder, the first adder building pairwise the sum of the first half of the input data points and the second half of the input data points, and the second adder building pairwise the difference of the first half of the input data points and second half of the input data points.

4. The signal processor of claim 3, wherein the computing unit receives adder output data alternatingly from the first and second adder.

5. The signal processor of claim 1, wherein the computing unit receives one adder output data value in each processor clock cycle.

6. The signal processor of claim 1, wherein the adder unit comprises a first adder, a second adder, a first computing unit, and a second computing unit, each adder feeding one computing unit.

7. The signal processor of claim 6, wherein each computing unit has an associated output buffer.

8. The signal processor of claim 1, wherein the signal processor comprises four computing units, the adder unit comprises four adders, each adder feeding one computing unit.

9. The signal processor of claim 1, wherein the memory has first and second memory sections, each section being capable of storing one half of data of one set of input data points.

10. The signal processor of claim 1, wherein the memory has first and second memory parts, each part being capable of storing one full set of input data points.

11. The signal processor of claim 10, wherein one memory part is being written with data and another memory part being read out to the adder.

12. The signal processor of claim 1, wherein the computing unit has several computing elements for performing simultaneous transformations.

13. The signal processor of claim 1, wherein the signal processor is located on a single chip.

14. A method for performing a discrete Fourier Transformation of an input signal of an even number of input data values on a signal processor having a first memory section, a second memory section, an adder and a computing unit with a cache memory, to produce an output signal, which method comprises the following steps:

(a) storing transformation coefficients $$W_N^{ik} = e^{-j\frac{2ik}{N}}$$

in the cache memory, anytime prior to step (d);

(b) storing the first half of data values in the first memory section, storing the second half of data values in the second memory section;

(c) building in either order a sum vector and a difference vector (c.1) $g_e(i)=x(i)+x(i+N/2)$ of the pairwise sums of one data value of the first half data values and one data value of the second half data values with the adder, and (c.2) $g_o(i)=x(i)-x(i+N/2)$ of the pairwise differences of one data value of the first half data values and one data value of the second half data values with the adder;

(d) converting the sum vector to a first plurality of log signals;

(e) converting the difference vector to a second plurality of log signals;

(f) performing the following matrix operations in either order (f.1)

$$X_e(k) = \sum_{i=0}^{N/2-1} g_e(i)W_N^{ik}, \quad k = 0, 2, \ldots N-2,$$

upon the first plurality of log signals with the computing unit, and (f.2)

$$X_o(k) = \sum_{i=0}^{N/2-1} g_o(i)W_N^{ik}, \quad k = 1, 3, \ldots N-1,$$

upon the second plurality of log signals with the computing unit; and (g) outputting as output signal the Fourier Transform X(k) of the input signal wherein $X_e(k)$ are the even elements thereof and $X_o(k)$ are the odd elements thereof.

15. The method of claim 14 wherein both steps (c. 1) and (c.2), as well as both steps (d.1) and (d.2) are performed simultaneously.

16. The method of claim 14, wherein both steps (c.1) and (c.2), as well as both steps (d.1) and (d.2) are performed simultaneously, building one sum and/or one difference in each processor clock cycle.

17. The method of claim 14, wherein performance of the steps (c.1) and (c.2), (d. 1) and (d.2) is begun during the performance of the steps (a) and (b).

18. The method of claim 14, wherein the steps (a) and (b) are performed with a storage clock rate that is twice the clock rate of the computing unit.

19. The method of claim 14, wherein the method is performed on a signal processor having a computing unit with several computing elements for performing simultaneous transformations.

20. A signal processor comprising:

random access memory for storing N input data points, an adder unit for adding a real part of the N input data points $x(i)$ to a real part of the N input data points $x(i+N/2)$, where $i=0$ to $N-1$, and providing adder output data;

a log converter to perform logarithmic conversion on the adder output to generate log signals;

a computing unit having several processing elements for performing mathematical operations in parallel upon the log signals to generate processed signals;

an inverse-log converter to perform inversion-logarithmic conversion of the processed signals to generate inverse-log signals; and an accumulator to sum the inverse-log signals to produce accumulated signals.

21. The signal processor of claim 20, wherein each processing element has a computing element for performing multiplications on input data points.

22. The signal processor of claim 20, wherein each computing element is adapted to perform multiplications as additions in the logarithmic domain.

23. The signal processor of claim 20, wherein each processing element has an accumulator for summing data.

24. The signal processor of claim 20, wherein the computing unit has a logarithmic converter for converting input data points into logarithmic form, each processing element has a computing element for performing multiplications on input data points as additions in the logarithmic domain, each processing element has an associated inverse logarithmic converter for converting data logarithmic into normal form, each processing element has and an accumulator for summing data in the normal domain.

25. A signal processor comprising:

a memory to store N inputs signals;

an arithmetic unit to add input signal $x(i)$ with input signal $x(i+N/2)$, where $i=0$ to $N-1$ to generated output signals;

a log converter to perform logarithmic conversion on the output signals to generate log signals;

a processing unit to perform mathematical operations on the log signals to generate a processed signals;

an inverse-log converter to perform inversion-logarithmic conversion of the processed signals to generate inverse-log signals; and an accumulator to sum the inverse-log signals to produce accumulated signals.

26. The signal processor of claim 25 further comprising a formatting unit to format the output signals.

27. The signal processor of claim 26 further comprising a reformatter unit to reformat the serial accumulated signals.

28. The signal processor of claim 25 further comprising a parallel-to-serial buffer to convert parallel accumulated signals to serial accumulated signals.

29. A method of performing a Fourier Transformation comprising the steps of:

storing N input signals in random access memory;

adding input signal $x(i)$ to input signal $x(i+N/2)$, where $i=0$ to $N-1$, to generate output signals;

converting the output signals to log signals;

processing the log signals to calculate Fourier transformations signals;

converting the Fourier transformations signals to inverse-log signals; and summing the inverse-log signals to produce accumulated signals.

* * * * *